United States Patent [19]
Jackson

[11] 3,781,695
[45] Dec. 25, 1973

[54] DIGITAL PHASE-LOCKED-LOOP

[75] Inventor: Edward J. Jackson, Boulder, Colo.

[73] Assignee: Westinghouse Electric Corporation, Pittsburgh, Pa.

[22] Filed: May 4, 1972

[21] Appl. No.: 250,128

[52] U.S. Cl. .................................. 328/155, 328/44
[51] Int. Cl. .............................................. H03b 3/04
[58] Field of Search .............................. 328/155, 44; 307/222, 155

[56] References Cited

UNITED STATES PATENTS

| | | | |
|---|---|---|---|
| 3,337,814 | 8/1967 | Brase et al. | 328/155 X |
| 3,544,717 | 12/1970 | Smith | 328/155 X |
| 3,544,907 | 12/1970 | Bleickardt | 328/155 X |

*Primary Examiner*—John S. Heyman
*Attorney*—F. H. Henson et al.

[57] ABSTRACT

A digital phase-locked-loop circuit for shifting the phase of the output of a digital divider chain by an amount which is linearly related to the phase difference between the divider output and some other received signal having substantially the same frequency.

8 Claims, 7 Drawing Figures

DIGITAL PHASE-LOCKED-LOOP

BACKGROUND OF THE INVENTION

1. Field of the Invention

A technique for phase detection and synchronization of phase has many applications including phase measuring equipments, phase tracking radio receivers, and radio navigation systems. One specific application is the VLF Omega navigation system. Broadly, the digital technique disclosed as wide application in many systems which now use analog phase-locked-loops and mechanical phase tracking servos.

2. Description of the Prior Art

The conventional phase detector, both digital and analog, has an output that is proportional to the sine of the phase error. If the phase error falls within the range $-\pi/2 < \phi < \pi/2$, this type of phase detector is quite accurate. But, if the phase error is larger, indeed if it approaches an error of $\pm\pi$, the output would no longer be proportional to the phase error but rather would decrease for $\phi < -\pi/2$ and $\phi > \pi/2$. By using a linear phase detector, sometimes referred to as a sawtooth phase comparator and digital circuitry, this problem is overcome.

Prior art phase-locked-loop circuits have generally employed a voltage controlled oscillator (VCO) to control the phase of the local reference signal. The phase difference registers as a voltage which in turn operates to control the reference signal. A VCO used in this appliclation must have good stability and consequently is expensive. Further, if more than one signal is being tracked, then more than one VCO must be used. Therefore, a more desirable means of controlling the phase of the reference signal is to use one reference oscillator of fixed frequency and to derive the required reference signals from it with independent means of controlling the phase in correspondence with each received signal. The digital technique disclosed herein achieves this end.

SUMMARY OF THE INVENTION

The subject invention is directed to a digital phase-locked-loop circuit for locking in phase a first signal and a second signal of nominally the same frequency derived from some reference signal. An up-down counter produces a resultant positive or negative count, proportional to the lead or lag of the phase of the second signal to the first signal, which is applied through feedback means to adjust the second signal to some fixed phase relationship to the first signal.

DESCRIPTION OF THE PREFERRED EMBODIMENTS

Figure 1:
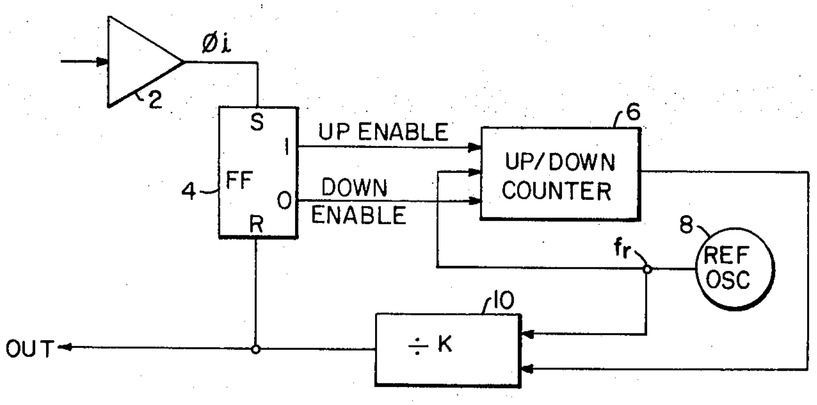
FIG. 1 is an electrical block diagram of a digital phase-locked-loop circuit illustrative of the preferred embodiment of the subject invention.

Looking first at FIG. 1, a first signal is shaped by a differential comparator 2 so that the signal $\phi_i$ applied to the set input S of flip-flop 4 is a series of short pulses derived from the coincident with the zero crossing points of the first signal. A second signal $\phi_o$ is applied to the reset input R of flip-flop 4. The signal $\phi_o$ is also a series of short pulses having essentially the same frequency as the signal $\phi_i$. Clearly the derived series of the pulses $\phi_i$ and $\phi_o$ must occur at the same phase angles for each respective signal but not necessarily at the zero crossing points as is herein shown and disclosed. The input pulses representative of $\phi_i$ set the flip-flop in the up enable mode and the input pulse representative of $\phi_o$ reset flip-flop 4 to the down enable mode. During the time that the flip-flop 4 is set by the input signal $\phi_i$, the up/down counter 6, having $k$ stages, counts up. During the time that flip-flop 4 is reset by the output signal $\phi_o$, the up/down counter 6 counts down. The counter 6 counts pulses from reference oscillator 8 which supplies pulses at a constant frequency $f_r$. The resultant count in the up/down counter 6 is proportional to the phase difference between signals $\phi_i$ and $\phi_o$. The up/down counter, as is well known in the art, includes $k$ stages which typically are flip-flops and starting with a count of zero, counts either up or down. The up and down counting continues until a resultant count of $\pm 2^k$ is reached.

When the up/down counter reaches a resultant count of $\pm 2^k$, a pulse is delivered to the divider 10 where the divider 10 acts on the signal by a factor $1/K$. The pulse to the divider 10 at the frequency $f_c$ will either add or subtract one count, thus advancing or retarding the phase of $\phi_o$ by $2\pi/K$ radians depending on whether the resultant count was up or down. The inputs to the divider are the adjusting pulse signal at a frequency $f_c$ from counter 6 and the reference signal at a frequency $f_r$. Divider 10 has an output $\phi_o$ which is applied to the reset input of flip-flop 4 and is also the output signal of the digital phase-locked-loop. Divider 10 is representative of a divide-by-$K$ circuit which is well known in the art.

Figures 2A, 2B, 2C:
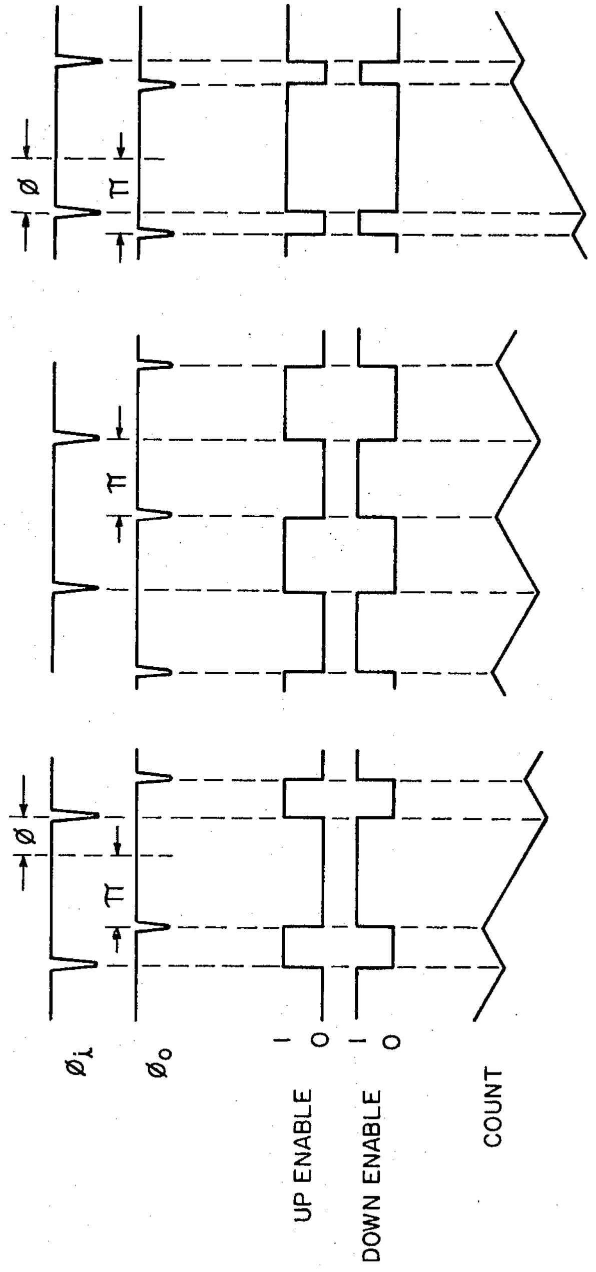
FIGS. 2A, 2B and 2C show respectively the counting sequence for the three cases of negative phase error, zero phase error and positive phase error.

The operation of the counter 6 is shown for three different cases in FIG. 2. The phase difference between the first or incoming signal $\phi_i$ and the second or output signal $\phi_o$ is represented by $\phi$. In FIG. 2, the operation of the up/down counter 6 responsive to the phase difference $\phi$ is shown for a negative phase error (FIG. 2A), a zero phase error (FIG. 2B) and a positive phase error (FIG. 2C). When a negative phase error exists, the resultant count will be down and when a positive phase error exists, the resultant count will be up. When there is zero phase error between the input and output signals the resultant count will be zero. The resultant count rate is $$f_{u-d} = \phi(f_r/\pi) \qquad (1)$$

where:

$\phi$ = the phase error $\phi_i - \phi_o$, and $f_r$ = the frequency of the reference signal supplied by the reference oscillator 8.

Since a pulse to the divider 10 is delivered only when a resultant count of $\pm 2^k$ is reached, the rate of adding or subtracting counts will be $$f_c = \phi f_r / \pi 2_k \quad (2)$$

Since the phase of $\phi_o$ is advanced or retarded by the amount $2\pi/K$ radians for each pulse from the up/down counter, the phase correction rate is $$d\phi_o/dt = (2\phi f_r/K2^k) \text{ radians per second.} \quad (3)$$

The input signal $f_c$ from the up/down counter 6 to the divider 10 causes a phase shift in the signal $\phi_o$. This affect can best be appreciated by looking at the frequency of the output signal from divider 10. Since $$f_o = (f_r/K) + (f_c/K),$$

by substituting for $f_c$ from equation (2) one obtains:

$$f_o = (f_r/K) + (\phi f_r/K\pi 2^k \quad (4)$$

The output of the divider has a quiescent frequency therefor of $f_r/K$ and it is readily seen that when $\phi_o$ locks in some fixed phase relation with $\phi_i$, $f_o$ will be at a value of $f_r/K$. It can also be seen from the above equation that $f_o$ can vary between the value of $f_r/K\ 1 - (1/2^k)]$ where $\phi = -\pi$ to $f_r/K\ [1 + (1/2^k)]$ when $\phi = +\pi$. Thus, in the range of phase error from $-\pi$ to $+\pi$ these frequencies represent the entire lock range of the phase-locked-loop.

Figure 3:
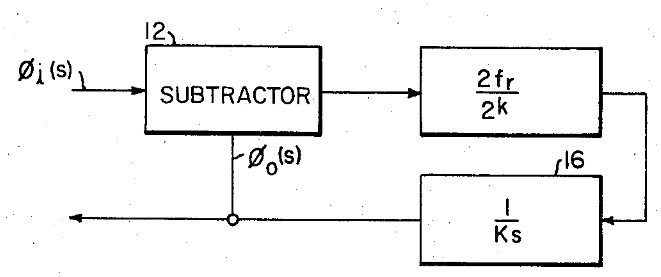
FIG. 3 is a block diagram showing the closed loop transfer function of the digital phase-locked-loop.

The operating characteristics of this phase-locked-loop can best be understood by an analysis of FIG. 3 which shows a transform model of the phase-locked-loop. The flip-flop 4 and the up/down counter 6 are replaced respectively by a subtractor 12 followed by block 14 representing a gain element of $2f_r/2^k$. The divider 10 is replaced by an integrator 16 with a gain of $1/K$. Clearly then, the closed loop transfer function is $$H(s) = [\phi_o(s)/\phi_i(s)] = (a/\ s + a) \quad (5)$$

where:

$$a = 2f_r/K2^k \quad (6)$$

is the loop gain. This is a first order loop and is unconditionally stable since the poles of $H(s)$ are in the left-hand plane of the $s$ domain for all positive values of $a$.

The response of the phase-locked-loop to the input of a phase step function and ramp function can be determined analytically thereby showing the trade-off among the loop parameter to achieve various operating characteristics for different applications. Since the phase-locked-loop responds linearly for a phase error $-\pi < \phi < \pi$ an analysis of this type is valid for all phase errors between $-\pi$ and $\pi$.

A phase step function input corresponds to the conditions at time of turn on or at a time subsequent to turn on when the input signal is changed. The output response to a phase step input of $\Delta\phi/s$ is thusly, $$\phi_o(s) = (\Delta\phi/s)\ H(s)\ \phi_o(s) = (\Delta\phi/s)\ (s/s{+}a)\ \phi_o(s) = (\Delta\phi/s) - (\Delta\phi/s{+}a) \quad (7)$$

Since the phase error response is $\phi(s) = \phi_i(s) - \phi_o(s)$, it follows from equation (7) that:

$$\phi(s) = \Delta\phi/s{+}a \quad (8)$$

In the time domain, equations (7) and (8) become:

$$\phi_o(t) = \Delta\phi(1 - e^{-at}) \text{ for } t > o \quad (9)$$

$$\phi(t) = \Delta\phi\, e^{-at} \text{ for } t > o \quad (10)$$

An important characteristic of the phase-locked-loop is the maximum time required for phase lock. If phase lock is defined as the condition of $\phi < 2\pi/100$ radians and the maximum phase error of $\pi$ radians is assumed, then the maximum time to acquire phase lock, $T_L$ is about $4/a$ seconds.

Figure 4:
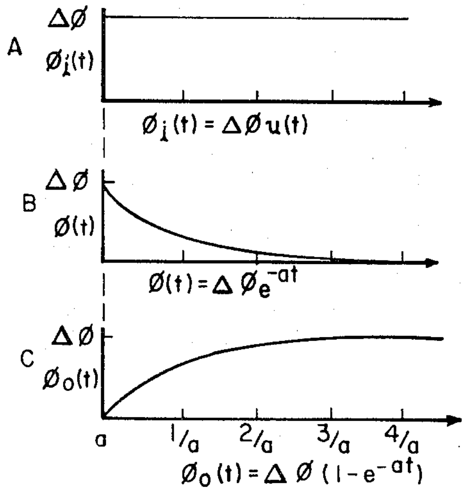
FIG. 4 shows the curves representative of the step response of the digital phase-locked-loop.

The response of the digital phase-locked-loop to a step function in shown graphically in FIG. 4. Curve ($a$) shows input signal $\phi_i(t)$ applied to the phase-locked-loop at some time $t = o$ with a phase error $\Delta\phi$. Curve ($b$) shows the correction of the phase error $\phi(t)$ as a function of time. Curve ($c$) shows phase lock of the output signal $\phi_o(t)$ in some time approximately $4/a$.

An analysis of the response of the phase-locked-loop to a phase ramp function input gives an indication of steady state error of the system for a given frequency offset. For a frequency offset between the input and output frequencies of $\Delta\omega = \omega_i - \omega_o$, $\phi_i(t) = \Delta\omega t$ and in the $s$ domain $\phi_i(s) = \Delta\omega/s^2$. The output response is then:

$$\phi_o(s) = \Delta\omega/s^2 - (\Delta\omega/a/s) - (\Delta\omega/a/s{+}a) \quad (11)$$

The phase error response is:

$$\phi(s) = (\Delta\omega/a/s) - (\Delta\omega/a/s{+}a) \quad (12)$$

In the time domain, equations (11) and (12) become:

$$\phi_o(t) = \Delta\omega t - (\Delta\omega/a) + (\Delta\omega/a)\ e^{-at} \text{ for } t < 0 \quad (13)$$

$$\phi(t) = (\Delta\omega/a) - (\Delta\omega/a)\ e^{-at} \text{ for } t > 0 \quad (14)$$

Finally, the steady state error for a given frequency offset can be found as follows:

$$\lim_{t\to\infty} \phi(t) = \lim_{t\to\infty} \left[\frac{\Delta\omega}{a} - \frac{\Delta\omega}{a} e^{-at}\right] = \frac{\Delta\omega}{a} \quad (15)$$

Figure 5:
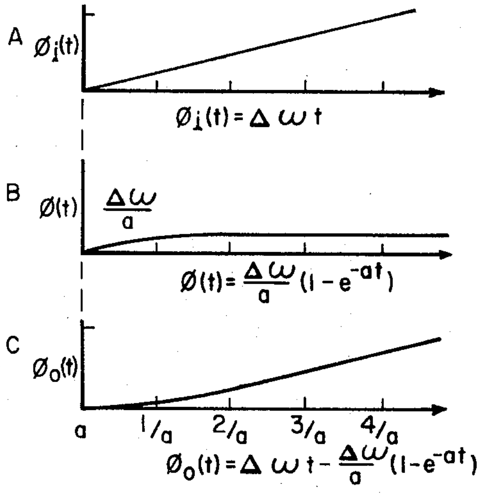
FIG. 5 shows the curves representative of the ramp response of the digital phase-locked-loop.

FIG. 5 shows the response of the phase-locked-loop to a phase ramp function input. Curve ($a$) shows $\phi_i(t)$ for the condition of a phase ramp function input. Curve (*b*) shows the phase error $\phi(t)$ as a function of time approaching a steady state error of $\Delta\omega/a$. Curve (*c*) shows the response of the output signal $\phi_0(t)$ to the phase ramp input signal as tracking $\phi_i(t)$ in an exponentially increasing manner.

An important characteristic of the phase-locked-loop is its effective noise bandwidth and the consequent effect of the noise bandwidth on the standard deviation of the phase jitter at the output. The received signal can often be contaminated with noise which causes a phase jitter which should be made as small as possible for accurate phase measurement. The effective noise bandwidth of the phase-locked-loop in Hertz is $$B_L = \int_0^{\infty} \left| H(j\omega) \right|^2 \frac{d\omega}{2\pi} \qquad (16)$$

where $$H(j\omega) = H(s)|_{s=j\omega}|.$$

For a first order loop such as the digital phase-locked-loop herein disclosed, the effective noise bandwidth then becomes:

$$B_L = a/4 \qquad (17)$$

For white Guassian noise with one side spectral density $N_o$ and a carrier amplitude $A$ the variance of the output phase in terms of effective noise bandwidth is:

$$\sigma^2\phi = N_o B_L / A^2 \qquad (18)$$

Clearly to keep the phase jitter small, the effective noise bandwidth must also be small.

Since the effective noise bandwidth is directly proportional to the loop gain, *a*, the loop gain must be kept small to avoid large phase jitter. But, as was shown above in equations (15) and (10), if the loop gain is made small, the steady state error when there is a frequency offset is increased and also the time to acquire phase lock $T_L$ is increased. It can readily be seen that the loop gain, *a*, must be chosen for the given application of the phase-locked-loop such that the values of the effective noise bandwidth $B_L$, the steady state error when there is a frequency offset, and the time required to gain phase lock $T_L$ are optimized.

Although the digital phase-locked-loop of this invention has wide application to a variety of phase measuring operations, one specific application for which it has been used is in an Omega receiver used in the worldwide Omega navigation system. To understand more fully the above described phase-locked-loop a direction of its application in the Omega receiver is most helpful. However, it must be understood that this description is only exemplary of various applications of the subject invention and serves to highlight advantages gained by using this digital loop.

The Omega radio navigation system has been established to provide global navigational capability. The system operates in a range from 10 to 14 kHz and, as presently conceived, will employ eight stations radiating synchronized signals. Each station will transmit three basic frequencies for navigational purposes: 10.2, 11.33 and 13.6 kHz. The basic measurement used to determine location is the phase difference of the received signals from any pair of stations. The phase difference between signals, presented as a time difference, can be translated to a difference in distance. Such a calculation is based on basic knowledge of the physics of wave propagation. Any given distance difference, i.e., phase difference between received signals of two stations, will define a spherically modified hyperbolic line of position on the earth's surface. The position of any Omega receiver receiving signals from two or more stations is determined by identifying the actual cycle count and the phase difference between two of those signals from a known reference point. By also making measurements of cycle count and phase difference from another pair of stations a second line of position on the earth's surface can be established. The intersection of the two lines then establishes a fix; the location of the receiver can then easily be established in terms of the electromagnetic grid.

In Table 1, typical values have been chosen for the parameters of the phase-locked-loop to provide acceptable accuracy and efficiency for an Omega navigation receiver.

TABLE 1

Typical Values for PLL in an Omega Receiver

| | | |
|---|---|---|
| $f_i$ | 10.2 kHz | 13.6 kHz |
| K | 100 | 100 |
| $f_r$ | 1.02 MHz | 1.36 MHz |
| $k$ | 14 | 14 |
| $a$ | 1.25 | 1.66 |

By choosing the loop parameters of Table 1, a phase measurement accuracy of 1 centicycle (cec) is achieved. It is possible to calculate the operational characteristics of this particular phase-locked-loop to show that such accuracy is attainable while keeping other operational requirements within acceptable limits.

The advantages of choosing the parameters of Table 1 for application in an Omega receiver include the possibility of using a relatively inexpensive temperature compensated crystal oscillator since stability of only one part in $10^6$ is necessary for measurement accuracy of 1 cec. Thus, a relatively inexpensive temperature compensated crystal oscillator could be used in place of a more expensive oven controlled oscillator. Further, only one such oscillator is required regardless of the number of phase-locked-loops in a given receiver (the most basic Omega receiver requires at least four phase-locked-loops to track two lines of position). In this example the reference frequencies $f_r$ of 1.02 MHz and 1.36 MHz can be derived from a single 4.08 MHz reference oscillator by appropriate dividing circuitry.

Loop gain *a* and consequent number of stages *k* given in Table 1 are derived from equations (6) and (15) above consistent with the requirement of 1 cec measurement accuracy and oscillator stability of 1 part in $10^6$. The maximum time required to acquire phase lock, $T_L = 4,/a$ then is 3.2 sec. at $f_i = 10.2$ kHz and 2.42 sec. at $f_i = 13.6$ kHz. The effective noise bandwidth $B_L$ calculated from equation (17) above is 0.3125 Hz at 10.2 kHz and 0.415 Hz at 13.6 kHz. Therefore assuming a signal-to-noise power density ratio of $A^2/N_o$ of 100 (20 db) the phase variance $\sigma(\phi)$ calculated from equation (9) above is 0.0558 radians or 0.989 cec at 10.2 kHz and 0.0644 radians or 1.02 cec at 13.6 kHz.

Perhaps a lower standard deviation of phase jitter would be desirable but as pointed out above, this would require a greater loop gain. Greater loop gain would, in turn, means a larger steady state error for a given frequency offset. Thus, to maintain a maximum steady state error of 1.0 cec while reducing phase jitter would necessitate using a more expensive oscillator with stability better than one part in $10^6$. As can be readily seen, the trade off involves a question of optimizing the characteristics of reduced steady state error, rapid acquisition of phase lock, and decrease standard deviation of phase jitter. It is well to note that the signal to noise density ratio in the Omega navigation receiver application will be greater than 20 db, and therefore, the standard deviation of phase jitter will not be as great as calculated above.

The specific example of use of the digital phase-locked-loop in the Omega receiver points out the flexibility of the disclosed digital phase-locked-loop. The trade off involved in the parameters of the loop allows one to design specifically for various applications yet retaining the basic concept disclosed.

I claim as my invention:

1. A digital phase-locked-loop circuit for locking in phase a first signal and a second signal of substantially the same frequency comprising in combination:

bistable means having an up-enable and a down-enable output and responsive to certain phase angles of said first signal to set said bistable means to said up-enable output and responsive to the same phase angles of said second signal to reset said bistable means to said down-enable output;

oscillator means for producing a reference signal having a frequency $f_r$;

counter means operably connected to said bistable means and said oscillator means for counting in one direction in response to said up-enable output and for counting in the opposite direction in response to said down-enable output at some counting rate proportional to the frequency of said reference signal to provide a resultant count output; and divider means operably connected to said oscillator means and said counter means having an output of said second signal.

2. The digital phase-locked-loop circuit of claim 1 wherein said phase-locked-loop further includes comparator means responsive to said first signal for deriving a series of pulses coincident with the zero crossing points of said first signal, said series of pulses applied to said bistable means to set said bistable means to said up-enable output.

3. The digital phase-locked-loop circuit of claim 1 wherein said counter means includes an up-down counter having $k$ stages for providing a count signal directly proportional to both the frequency of said reference signal and the phase difference of said first and second signals and inversely proportional to the factor $2^k$.

4. The digital phase-locked-loop circuit of claim 3 wherein said divider means is a divide-by-$K$ circuit, and further wherein the frequency of said reference signal is greater by said factor $K$ than the frequency of said first signal.

5. The digital phase-locked-loop circuit of claim 4 wherein said phase-locked-loop has a closed loop transfer function $H(s) = a/s+a$ where the loop gain $a = 2f_r/K2^k$.

6. The digital phase-locked-loop circuit of claim 4 wherein said divide-by-$K$ circuit has an output frequency $F_o = f_r/K\ [1 - (1/2^k)]$ when the phase difference between said first signal and said second signal is $-\pi$ radians and has an output frequency $f_o = (f_r/K)\ [1 + (1/2^k)]$ when the phase difference between said first signal and said second signal is $\pi$ radians and has some intermediate output frequency for phase differences between $-\pi$ radians and $+\pi$ radians.

7. A digital phase-locked-loop for looking in phase a first signal and a second signal of substantially the same frequency comprising:

means for producing a reference signal at a frequency $f_r$;

gain means operably responsive to said reference signal and to said first and second signals for comparing the phase of said first signal with the phase of said second signal to obtain a resultant count signal linearly proportional to the phase difference between said first and said second signals;

divider means having an output of said second signal operably connected to said gain means responsive to said resultant count signal and said reference signal for shifting the phase of said second signal to lock in phase with said first signal.

8. A digital phase-locked-loop system for locking in phase a plurality of pairs of first and second signals each pair of substantially the same frequency comprising in combination:

a plurality of phase-locked-loops each including, bistable means having an up-enable and a down-enable output responsive to certain phase angles of a first signal to set said bistable means to said up-enable output and responsive to the same phase angles of a second signal to reset said bistable means to said down-enable output;

oscillator means for producing a reference signal having a frequency $f_r$;

counter means operably connected to said bistable means and said oscillator means for counting in one direction in response to said up-enable output and for counting in the opposite direction in response to said down-enable output at some counting rate proportional to the frequency of said reference signal to provide a resultant count output, and divider means operably connected to said oscillator means and said counter means and having an output of said second signal;

and wherein said oscillator means is common to each said phase-locked-loops.

* * * * *